United States Patent [19]
Harrison et al.

[11] Patent Number: 4,954,134
[45] Date of Patent: Sep. 4, 1990

[54] AGGLOMERATION OF GYPSUM, LIMESTONE, OR GYPSUM-LIMESTONE MIX

[75] Inventors: Cecil P. Harrison, Florence; Cullen G. Tittle, Tuscumbia, both of Ala.

[73] Assignee: Tennessee Valley Authority, Muscle Shoals, Ala.

[21] Appl. No.: 386,914

[22] Filed: Jul. 31, 1989

[51] Int. Cl.$^5$ .......................... C05G 5/00; C05D 3/02; B01J 2/00
[52] U.S. Cl. ............................. 23/313 R; 23/313 P; 71/63; 71/64.05; 106/774; 106/773; 106/784; 423/555
[58] Field of Search .................. 71/63, 61, 64.05; 23/313 R, 313 P; 106/109; 423/555

[56] References Cited

U.S. PATENT DOCUMENTS

| 3,214,261 | 10/1965 | Galloway | 71/63 |
| 3,660,068 | 5/1972 | Wilson | 71/63 |
| 4,277,253 | 7/1981 | Walter | 71/61 |
| 4,743,289 | 5/1988 | Miekus et al. | 71/63 |
| 4,832,728 | 5/1989 | Allan et al. | 71/64.11 |
| 4,846,871 | 7/1989 | Detroit | 71/63 |

FOREIGN PATENT DOCUMENTS

| 872714 | 6/1971 | Canada | 423/555 |
| 55-56087 | 4/1980 | Japan | 71/63 |
| 63-21276 | 1/1988 | Japan | 71/63 |

OTHER PUBLICATIONS

Browning, Jon. E., Agglomeration, Grounding Larser in Application & Technology, Chemical Engineering, Dec. 1967, pp. 147–170.

Primary Examiner—Gary P. Straub
Attorney, Agent, or Firm—Robert A. Petrusek

[57] ABSTRACT

An improved process for economically and effectively granulating solid, finely-divided, particulate feedstock comprising phosphogypsum, limestone, or mixtures comprising sulfogypsum, natural or mineral gypsum, or mixtures thereof and limestone and having from about 80 to 95 percent by weight of such sulfogypsum/mineral gypsum to effect products which exhibit excellent physical and chemical properties relative to dustiness, storage, handling, and perhaps most importantly, aqueous media-induced rapidity of reversion to a mesh-size distribution of particles substantially similar to the initial size distribution of said feedstock, which improved process involves introducing such relatively finely-divided feedstock, together with material comprising recycle thereof into a suitable agglomeration device, such as a rotary drum, and therein effecting agglomeration/granulation of such feedstock in the presence of aqueous media, the improvement comprising the utilization, in combination with said aqueous media, of relatively small portions of a newly discovered granulation/dispersion aid comprising dilute lignosulfonate solution.

14 Claims, 2 Drawing Sheets

AGGLOMERATION OF GYPSUM, LIMESTONE, OR GYPSUM-LIMESTONE MIX

The invention herein described may be manufactured and used by or for the Government for governmental purposes without the payment to us of any royalty therefor.

INTRODUCTION

The present invention relates to a new process and/or technique for granulating or otherwise agglomerating certain types of finely-sized phosphogypsum, finely-ground agricultural limestone, or certain mixtures of sulfogypsum or natural gypsum or both and limestone, and to the products resulting therefrom. More particularly, the present invention relates to the production of quality granular phosphogypsum, limestone, or sulfogypsum/natural gypsum-limestone products which have excellent storage and handling properties and are deemed to be, at the very least quite sufficient and very satisfactory for use in the agricultural industry, in the manufacture of Portland cement, or for use in road construction, and still more particularly, the present invention relates to a novel method for granulating relatively fine-sized agricultural gypsum, limestone, or mixtures thereof with the utilization therein of a relatively small, but predetermined, portion of a newly-discovered agglomeration-dispersant additive which new additive initially acts as a binder and subsequently acts, upon relatively easily-induced action, as a disintegrating/dispersing agent, said newly-discovered additive comprising a dilute lignosulfonate solution. In the practice of the principal and most preferred embodiment of the instant invention, all feedstock introduced thereto, including finely-sized phosphogypsum, agricultural limestone or mixtures of certain other types of gypsum, i.e., sulfogypsum or natural gypsum or both with predetermined amounts of limestone together with any recycled fines subsequently derived therefrom, or from other sources, if desired, and said newly-discovered lignosulfonate additive usually as a solution are generally fed directly to a bed of particulate materials maintained in free-flowing condition in any of a number of suitable granulation devices. The lignosulfonate preferably is a water-soluble metal or ammonium salt of lignosulfonic acid. An important feature of the instant invention is the fact that although the amount of agglomeration-dispersant agent is important to effecting the practice thereof, the invention may easily be carried out in readily available, everyday agglomeration equipment such as, for example, rotary-drum granulators or pan-type granulators.

BACKGROUND OF THE INVENTION

1. Field of the Invention

As is well known to all those skilled in this art, both calcium and sulfur are nutrients essential for the culture and/or propagation of most living plants and are generally classified by agronomists as secondary nutrients; with nitrogen, phosphorus, and potassium comprising the primary plant nutrients. It is also well recognized that such secondary plant nutrients, to wit, calcium and sulfur, are required for many major and economically important agricultural commodities including, for example, peanuts, as well as most cereals and fiber-producing crops.

The mineral limestone, comprising calcium carbonate (pure or impure). is found in great abundance and, when processed to fine particle-size distribution by, for example, grinding, is used extensively as a liming agent to aid in the adjustment of soil acidity (pH) to thereby effect the maximum production of most agricultural food and fiber crops. It is estimated that, in the United States, some 20 to 25 million tons of agricultural limestone is used annually. Larger-sized ($-6 +16$ Tyler Standard Screen Scale) limestone is also used as a filler in the production of numerous bulk-blended fertilizers.

The mineral gypsum, $CaSO_4 \cdot 2H_2O$, is found extensively in natural massive forms and also is produced in large quantities as a by-product when limestone and sulfuric acid are reacted to produce carbon dioxide (sulfogypsum) or when phosphate rock and sulfuric acid are reacted to produce wet-process phosphoric acid for use in the manufacture of phosphatic fertilizers (phosphogypsum). Gypsum is also used in the manufacture of Portland cement to prevent too-rapid setting and in road construction as a soil stabilizer. As used herein, finely-divided gypsum is either mined and comminuted, or otherwise obtained as a manmade by-product and used at a size distribution somewhat finer than agricultural limestone.

It is estimated that currently, about one-million short tons of gypsum is used annually in the southeastern United States for the cropping of peanuts. This material is applied to the peanut crop at the bloom stage so that when the gynophore "peg" enters the soil, adequate calcium from the gypsum source is readily available for realization of maximum crop yield. In other agricultural areas, large quantities of gypsum are applied to soils which are deficient in sulfur or to other soils to effect adjustments of the undesired salinity thereof.

Agricultural limestone and agricultural gypsum are oftentimes referred to by those skilled in the art as secondary nutrient fertilizers and are usually applied to the intended soil environment in a very finely-divided state. Such fine particle size is required for materials of relatively low solubility to achieve the desired rate of reaction in the soil; therefore, products with a low specific surface area may not be as effective as those applied to the soil as line powder. On the other hand, modern fertilizer-application equipment, designed for broadcast of or for row placement of solid fertilizers, is intended for handling free-flowing granular-type materials such as, for example, granular or pelletized ammonium nitrate or urea. Consequently, numerous problems are encountered when such equipment is used, or more correctly, misused by operators for field placement of such finely-divided material. As specified by USDA, agricultural limestone is of a U.S. Standard Testing Sieve particle-size distribution so that no less than 90 percent passes through the No. 10 mesh screen and no less than 50 percent passes through the No. 60 mesh screen. As shown in Table II and noted in the discussion just thereafter in Example I, infra, the actual size distribution for this material is considerably finer.

2. Description of the Prior Art

The utilization of lignosulfonates, a by-product of the paper pulping industry, is quite widespread and varied running the gambit from fillers for asunder different types of materials to conditioning agents or binders for a variety of products including, for instance, animal feed wherein it also may act as a pelletizing aid as well as a source of metabolizable energy. The Food and Drug Administration apparently has approved same for use in animal feeds in amounts up to 4 percent by weight.

In the embodiment of being utilized as a binding agent, in U.S. Pat. No. 4,587,358, Blouin, May 6, 1986, assigned to the assignee of the present invention, there is disclosed that the utilization of minute amounts, i.e., usually less than about 1 percent and preferably from about 0.4 to about 0.8 percent by weight of lignosulfonates based on the weight of the final product, may be utilized to impart to urea improved storage stability particularly that attribute characterized by a substantial reduction and tendency for caking during storage of freshly prepared urea particles. Blouin teaches that various lignosulfonates may preferably be mixed with the urea melt to ensure a homogeneous mixture prior to the solidification of the resulting product.

In U.S. Pat. No. 4,676,821, Gullett, et al., Jun. 30, 1987, there is taught an improvement evolving from the teachings of Blouin, supra. wherein the product produced by Blouin is utilized in the teachings of Gullett, et al., as substrate for the production of sulfur-coated urea products. According to Gullett, et al., such lignosulfonate-containing substrate results in a sulfur-coated product having a substantially increased time of dissolution, as compared to urea substrate conditioned in the conventional manner with formaldehyde. Accordingly, Gullett, et al., can obtain a target dissolution rate with substantially less sulfur coating utilizing such substrate than with the conventional formaldehyde urea thereby, of course, resulting in a product having a substantially increased nitrogen content.

In U.S. Pat. No. 4,743,289, Mickus, et al., May 10, 1988, assigned to the assignee of the present invention, there is taught that lignosulfonates can be substituted for several materials heretofore utilized as granulation aids during the production of fertilizers produced in size to be eminently effective in the later production of bulk-blended materials. In particular, Mickus, et al., teach that they can substitute several lignosulfonates for the alum that was used as a granulation aid in prior work of two of the coinventors for effecting production of granular crystalline by-product ammonium sulfate. This work of Mickus, et al., evolved from the earlier work of Harrison, et al., taught, described, and claimed in U.S. Pat. No. 4,589,904, May 5, 1986, and assigned to the assignee of the present invention.

SUMMARY OF THE INVENTION

The present invention comprises a method for converting finely-sized phosphogypsum of a U.S. Standard Testing Sieve size distribution having about 40 percent minus 325 mesh or agricultural limestone with a U.S. Standard Testing Sieve size distribution so that at least no less than 50 percent passes the No. 60 mesh screen U.S. Standard Testing Sieve, or a mixture of from 85 to 95 percent sulfogypsum or natural gypsum or both and from about 5 to 15 percent limestone by weight to the typical granular fertilizer-size ($-6 +16$ Tyler Standard Screen Scale) particles herein determined eminently suitable for subsequent direct application to soil, for addition to bulk-blend fertilizers, for use in road construction or other soil-stabilizing applications, and for use in the manufacture of Portland cement. The granules resulting from the practice of these teachings exhibit excellent mechanical stability when dry so that dustiness is minimized during handling an application in conventional distribution equipment, yet after such particles are placed in contact with soil and contacted with water, they rapidly disintegrate to substantially their original ungranulated, fine particle-size distribution for realizing and effecting maximum crop response or other utilization thereof. In view of these considerations, it should now be obvious to those skilled in the art just how important the present invention is to the production and utilization of this class of materials in both the fertilizer and the cement industry as well as for other applications.

The present invention, as will become more readily apparent from a reading of the description, infra, details a method whereby finely-divided phosphogypsum, limestone, or a special blend or mixture of about 85 to about 95 parts of sulfogypsum or natural gypsum or both, and about 5 to about 15 parts of limestone are processed directly to the desired granular form by agglomerating same in combination with aqueous media and a relatively critical proportion of a newly-discovered additive, which new additive initially acts as a binder and subsequently acts, upon relatively easily-induced action, as a disintegrating/dispersing agent, with said newly-discovered additive comprising a dilute lignosulfonate solution.

Although this additive has been used as a binding or granulating agent with other types of materials, it has been added to such other different materials in amounts quite different from the critical, predetermined amounts found necessary to practice the instant invention. In the practice of the instant invention, it has been found that it is necessary to utilize almost an order of magnitude more of the lignosulfonates than is necessary for the agglomerating of urea or by-product ammonium sulfate; however, it has also been found that the practice of the instant invention with such increased amounts of lignosulfonate can be carried out in any readily available, commercially utilized equipment such as commonly used rotary-drum or pan-type granulators. It is not necessary in the operation of the instant invention to use or employ any specially designed or constructed equipment. Accordingly, the tradeoff in the use of greater amounts of relatively cheap additive is extremely desirable as compared to the requirement of substantial extra capital outlay for special equipment and attendant extra labor costs associated with its special use requirements. As will be appreciated, many of the prior-art teachings, albeit for different uses of lignosulfonate with different materials, require as little as about 0.1 percent by weight, whereas in the practice of the instant invention it has been found that between about 4 to 8 percent by weight, and usually more than about 5 percent but less than about 10 percent by weight, of lignosulfonate is necessary. The effecting of the process or method of the present invention is easily and effectively accomplished in any conveniently available granulation equipment such as, for example, a conventional TVA rotary-type ammoniator-granulator drum as in U.S. Pat. Nos. 2,729,554, Neilsson, Jan. 3, 1956, and 2,741,545, Neilsson, Apr. 10, 1956, assigned to the assignee of the present invention. For purposes of teaching, disclosing, and claiming the instant invention; the teachings, disclosures, and subject matter of said patents, i.e., '554 and '545, supra, are herewith and hereby incorporated herein by reference thereto.

Products made by the process of the instant invention in the manner described herein consist of hard, desirable-sized, free-flowing granules having excellent handling and storage properties. Furthermore, such resulting materials are eminently suitable for direct application to soil, for blending with other readily available dry-blend fertilizer materials, for use in the manufacture of Portland cement, and for use in soil-stabilization applications. The granules resulting from the practice of these teachings exhibit excellent mechanical stability when dry so that dustiness is minimized during handling and application in conventional distribution equipment, yet after such particles are placed in contact with soil and contacted with water, they rapidly disintegrate to substantially their original ungranulated, fine particle-size distribution for realizing and effecting maximum crop response.

It should be noted that In numerous situations, values given hereinafter are identified as being on a weight-percent basis; however, there are also many instances wherein values are recited merely on a percent basis. Accordingly, in those instances wherein no specific percent basis is stated, it is intended to be understood that such values are on a weight basis, unless, of course, it is specifically otherwise so indicated.

OBJECTS OF THE INVENTION

It is therefore a principal object of the present invention to perfect efficient and economical methods for granulating finely-divided gypsum, limestone, or mixtures thereof to thereby produce essentially nondusty, hard, nonfriable, granular materials of a size eminently suitable for use as direct-application fertilizers, or in the preparation of bulk-blended fertilizers.

Another object of the present invention is to perfect efficient and economical methods for introducing feedstock comprising finely-divided gypsum of the type comprising phosphogypsum, limestone, or mixtures comprising gypsum of the type comprising sulfogypsum, natural or mineral gypsum, or mixtures thereof and limestone and having from about 80 to 95 percent by weight of the mixture as such gypsum into granulating means and to therein produce essentially nondusty, hard, nonfriable, granular materials of a size eminently suitable for use as direct-application fertilizer materials, for use in solid-fertilizer bulk-blending operations, for use in manufacture of Portland cement, or for use as a soil stabilizer as in road construction and which resulting granular materials, when subsequently contacted with moisture, rapidly disintegrate and/or disperse to substantially the original finely-sized particles comprising said feedstock.

A still further object of the present invention is to perfect efficient and economical methods for introducing feedstock comprising finely-divided gypsum of the type comprising phosphogypsum, limestone, or mixtures comprising gypsum of the type comprising sulfogypsum, natural or mineral gypsum, or mixtures thereof and limestone and having from about 80 to 95 percent by weight of the mixture as such gypsum into granulating means and to therein produce essentially nondusty, hard, nonfriable, granular materials of a size eminently suitable for use as direct-application fertilizer materials, for use in solid-fertilizer bulk-blending operations, for use in road construction, or for use in manufacture of Portland cement; and which resulting granular materials are characterized as being wettable, and therefore easily induced into being returned to their substantially original finely-sized particle-size distribution comprising said feedstock, when such resulting granular materials are subsequently contacted with aqueous media.

Still another object of the present invention is to perfect efficient and economical methods for introducing feedstock comprising finely-divided gypsum of the type comprising phosphogypsum, limestone, or mixtures comprising gypsum of the type comprising sulfogypsum, natural or mineral gypsum, or mixtures thereof and limestone and having from about 80 to 95 percent by weight of the mixture as such gypsum into granulating means and to therein produce essentially nondusty, hard, nonfriable, granular materials of a size eminently suitable for use as direct-application fertilizer materials, for use in solid-fertilizer bulk blending operations, for use in road construction, or for use in manufacture of portland cement and which resulting granular materials are characterized as being wettable and therefore easily induced into being returned to their substantially original finely-sized particle-size distribution comprising said feedstock, when such resulting granular materials are subsequently contacted with aqueous media, and said methods being characterized by the fact that only relatively small amounts of an inexpensive, readily available, naturally-derived and therefore environmentally-acceptable additive, is utilized therein to provide the means necessary for both the binding action for effecting such granulation and for such subsequent reversion to the initial mesh-size distribution.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWINGS

The present invention will be better understood from a consideration of the following description taken in connection with the accompanying drawings in which.

Figure 1:
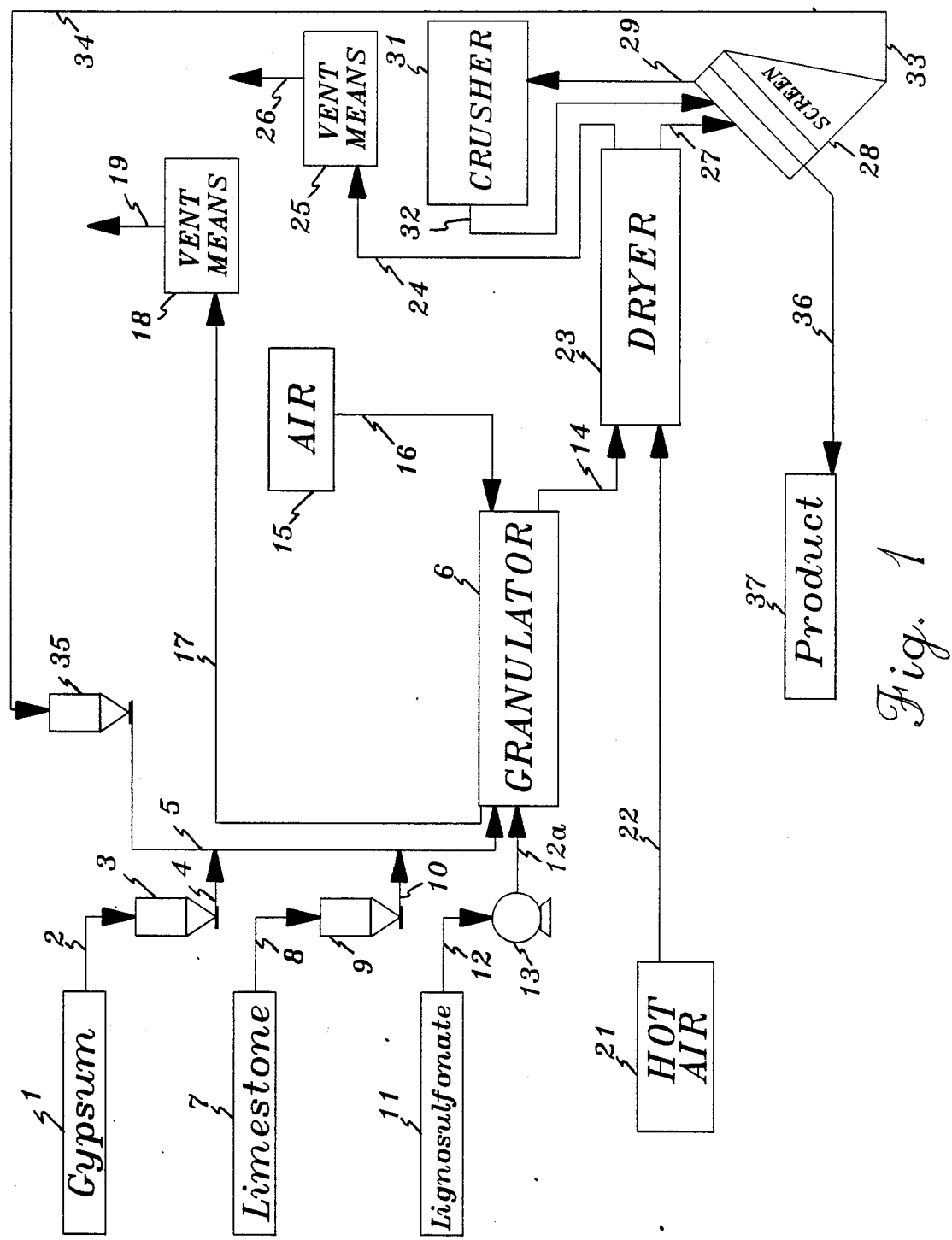
FIG. 1 represents a flowsheet of the preferred bench-scale plant arrangement generally illustrating the principles of our process which results in granular gypsum of the type comprising phosphogypsum, limestone, or mixtures comprising gypsum of the type comprising sulfogypsum, natural or mineral gypsum, or mixtures thereof and limestone and having from about 80 to about 95 percent by weight of such gypsum, all having the satisfactory properties herein required. For the sake of brevity and conciseness, only a description of a method which was utilized for production of granules made from feedstock comprising mixtures comprising gypsum of the type comprising sulfogypsum, natural or mineral gypsum, or mixtures thereof and limestone and having from about 80 to 95 percent by weight of such gypsum, is given herein since, as is will become readily apparent, a suitable and accurate description for production of either granular gypsum or limestone would be substantially that same or similar to this method except, of course, that only one such designated feed material would be used as feedstock in the process.
Figure 2:
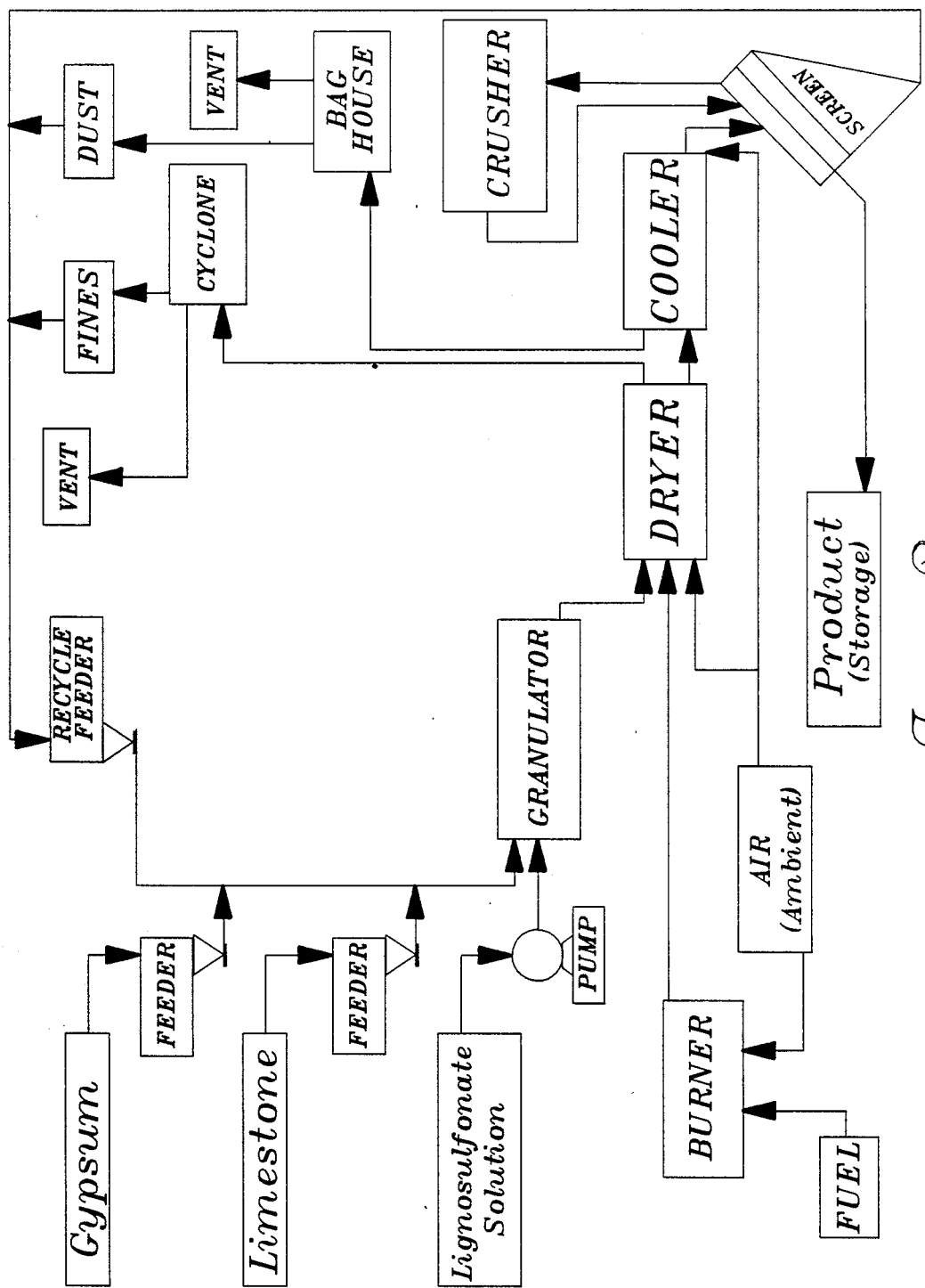
FIG. 2 is illustrative of a flowsheet which represents a preferred plant arrangement for the practice of the instant invention in a full-scale production facility and generally illustrates a number of modifications that would be necessary in order to adapt the sequence of steps and to employ the principles of the instant process for granulating finely-divided gypsum, limestone, or mixtures thereof as herein described in the bench-scale equipment. For instance, in the bench-scale granulation operation herein described, a cooler is not normally used because material throughput is low and heat loss, due to the fact that the ratio of the surface area of such equipment to the relative mass of material handled therein, is excessive. In addition, dust collectors as well as gas scrubbers are also unnecessary when operating at this scale of bench equipment because the quantities of materials handled are quite small. However, on a pilot-plant scale or a production-operation scale, the additional systems herein shown would be necessary.

Referring now more specifically to FIG. 1, granular gypsum, limestone is produced by introducing finely-divided sulfogypsum of a U.S. Standard Testing Sieve size distribution having usually substantially less than about 1 percent plus 20 mesh, and the remainder being about 0.1 to about 2 percent, although possibly as much as 5 percent is minus 20 plus 40 mesh, about 10 to 20 percent minus 40 plus 100 mesh, about 30 to 50 percent minus 100 plus 325 mesh, and about 30 to 50 percent minus 325 mesh from source 1 via line 2 to feeder means 3, and thence via lines 4 and 5 into granulator means 6 together with recycle material from a later-mentioned, described, and detailed screening operation, also by means of line 5. In this embodiment, it is preferred that simultaneously along with the feed of said finely-divided gypsum, supra, from source 1, finely-divided limestone of U.S. Standard Testing Sieve particle-size distribution of about 15 to 25 percent plus 20 mesh, about 15 to 25 percent minus 20 plus 40 mesh, about 15 to 30 percent minus 40 plus 100 mesh, about 10 to 20 percent minus 100 plus 325 mesh, and about 15 to 25 percent minus 325 mesh from source 7 is fed via line 8 to feeder means 9, and thence via lines 10 and 5, supra, to granulator means 6. Whether a single feed stream of finely-divided gypsum, or a single feed stream of finely-divided limestone, or as herein described a stream of each is fed to granulator means 6, in the preferred embodiment, simultaneously therewith, into granulator means 6, is introduced from source 11 via lines 12 and 12a and means for control of flow 13, relatively small and predetermined portions of lignosulfonate. The resulting granular material formed in granulator means 6 and discharged therefrom via line 14 normally contains from about 4 to about 10 percent moisture as determined by the AOAC vacuum desiccator method, and displays a crushing strength for the minus 7 plus 8 (Tyler Standard Screen Scale) size fraction in the range of from about 1 to about 2 pounds. During operation of the process, ambient-temperature air, generally illustrated as being introduced from source 15 into granulator means 6 via line 16, is caused to flow countercurrent to the flow of solids formed in and passed through granulator means 6 and exits same via line 17, venting means 18, and stack means generally illustrated at 19. Resulting granular material is discharged from granulator means 6 and flows via line 14 to dryer means 23. Hot air, from source 21, is directed via line 22 into dryer means 23 in a manner cocurrent to the flow of solids therethrough to effect moisture removal and subsequent hardening of the granules therein Introduced via line 14. The resulting cooled hot air, introduced via line 22 and passed through dryer means 23, is thereafter vented to the atmosphere via line 24, venting means 25, and stack means generally illustrated at 26. The resulting dried granular material, at a temperature in the range of from about 200 to about 240° F., having a moisture content (AOAC vacuum desiccator method) in the range of from about 0.1 to about 0.3 percent, and further having a crushing strength, as measured with minus 7 plus 8 (Tyler Standard Screen Scale) size granules, in the range of from about 3 to about 10 pounds, flows from dryer means 23 via line 27 to screening means generally illustrated as screen deck 28 where the granular material introduced thereupon is sized as desired. The oversize material from screen deck 28 flows via line 29 to crushing means 31 wherein the oversize material removed from granulator means 6, via dryer means 23, is partially crushed with the resulting partially-crushed material flowing via line 32 back to screen deck 28 for rescreening. The fines resulting from the operation of granulator means 6 and removed therefrom in conjunction with the aggregate of granular material discharged via line 14 as well as the fines resulting from the operation effected in crusher means 31 flow from screen deck 28 via line 33 to recycle line 34 which transports recycle material to recycle feeder means 35 and thence via line 5 to granulator means 6. The product, having the desired characteristics and properties, supra, is shown as being removed from screen deck 28 via line 36 to storage and/or transport means 37.

DESCRIPTION OF THE PREFERRED EMBODIMENTS

In the evolution of the present method for granulating very fine-sized particles of gypsum, limestone, or certain mixtures, supra, thereof, it has been discovered that solution-phase mixtures comprising from about 10 to about 25 percent of lignosulfonate, total weight basis, in water are very effective for agglomerating these materials or mixtures of these materials in any number or kind of standard granulation equipment.

More particularly, it has also now been determined that when the proportion of lignosulfonate in the agglomerating solution used for granulating such feedstock is in the range of about 25 percent by weight lignosulfonate and the remainder is water, the granules produced by the instant process are mechanically stable and the fraction thereof in the Tyler Standard Screen Scale size range of minus 7 plus 8 mesh exhibit crushing strengths of from about 4 to about 8 pounds.

Fertilizer granules should have sufficient mechanical stability to withstand normal handling without fracturing and without excessive sloughing to form dust. There are several standardized methods that may be used for measuring mechanical stability of granular fertilizer materials; however, the most simple and most widely-used in the fertilizer industry is the granule crushing strength test. In use of this method, it is necessary to crush at least 10, and preferably more, granules to obtain an average evaluation. Also, only granules of equal size should be compared, because crushing strength increases significantly with increase in particle size and, in view of this fact, crushing strength (in pounds) of the minus 7 plus 8 Tyler Standard Screen Scale size granules of a fertilizer material is recognized as a standard (see TVA Bulletin Y-147) for the mechanical stability of the fertilizer product. A fertilizer material with granule (minus 7 plus 8 Tyler Standard Screen Scale size) crushing strength of less than 3 pounds is not usually accepted by the industry.

It has been further determined that when the agglomerating solution contains insufficient amounts of the new additive/dispersant, i.e., about 5 percent by weight lignosulfonate and about 90 percent water, the granules produced under such operating conditions do not possess the desired mechanical stability, i.e., the crushing strength of the Tyler Standard Screen Scale size fraction of minus 7 plus 8 mesh particles is usually less than about 3 pounds.

The gypsum and limestone utilized as feedstock in the process of the instant invention may be any finely-divided gypsum or fine-ground limestone, pure or impure, that is otherwise normally utilized in the agricultural industry as fertilizer feedstock material, or as material which is normally utilized for adjusting alkalinity of soils, or any material that is commonly used in the cement industry as an additive in the manufacture of Portland cement or as material that is used as a soil stabilizer as in road construction.

In development of the granulation process, it was learned that phosphogypsum was readily granulated with lignosulfonate binder, but gypsum resulting from neutralizing sulfuric acid with limestone (sulfogypsum) and mined natural gypsum was not satisfactorily granulated alone, but was readily granulated with lignosulfonate solution when admixed with 5 to about 15, but preferably about 10 percent by weight of agricultural limestone.

Accordingly, for purposes of description of the instant invention and as used hereIn phosphogypsum means gypsum by-product resulting substantially from the production of phosphoric acid of the wet-process type wherein a mineral acid comprising sulfuric acid usually, but not necessarily, in admixture with recycled phosphoric acid, said phosphoric acid utilized for economics and for prevention of blinding of filter cloth, is reacted with phosphorus-bearing rock and such phosphogypsum results in a by-product therefrom.

Sulfogypsum as used herein means a gypsum by-product usually formed by the reaction of sulfuric acid with limestone rather than phosphate rock, supra, and oftentimes for effecting the production of carbon dioxide. Also as used herein, the cryptic or short form sulfogypsum/mineral gypsum means either sulfogypsum alone, mineral or natural gypsum alone, or any suitable mixture of each together. Likewise, mixtures of sulfogypsum/mineral gypsum-limestone means either one or both of sulfogypsum and mineral gypsum in admixture with suitable amounts of limestone.

Natural or mineral gypsum, of course, means the material normally found and mined from natural occurring deposits.

As noted above, in the development of the instant granulation process it was found quite unexpectedly that the utilization of the lignosulfonate binder as taught herein was sufficiently adequate when combined with phosphogypsum to yield a desired granular product suitable for use in currently utilized distribution equipment wherebY such product could be distributed to the desired situs subsequent to germination and/or growth of crops without the substantial disturbing thereof and in a form characterized such that subsequent application of moisture as provided either naturally through raInfall or artificially through irrigation means causes such particles to disintegrate into a size distribution substantially equal to the size distribution of the feedstock. On the other hand, it was found that the utilization of the lignosulfonate binder with essentially 100 percent of other types of gypsum including natural gypsum which had been adequately comminuted or sulfogypsum did not result in the desired granulated product as just described above. Indeed, in numerous tests wherein eIther sulfogypsum or comminuted natural gypsum or mixtures of the two in various portions were utilized as feedstock in combination with the new lignosulfonate agglomeration-dispersant additive, resulted in poorly formed or defined particles of essentially unpredictable size distribution and essentially totally unusable hardness and friability characteristics. Subsequently, it was discovered that these later two types of gypsum could, indeed, be properly granulated to produce the desired type granular products when used in further combination with relatively small but fairly critical amounts of limestone admixed therewith. As will be appreciated from the disclosure herein, in the course of utilizing the new lignosulfonate agglomerating/dispersing additive with feedstock comprising sulfogypsum comminuted natural gypsum or mixtures thereof, at least about 5 percent of the total product must comprise limestone in order to attain the desired results and objectives as herein described. More particularly, it was discovered that the instant process, when adapted to utilize these two types of feedstock gypsum materials works best when the limestone constituent comprises about 10 weight percent based on the final product. It has also been found that the upper limit of the weight percent of the limestone constituent in such instances is for all practical purposes to be about 15 weight percent, it being understood, of course, that the thrust of this embodiment of the instant invention is to granulate these two types of gypsum feed materials and that amounts greater than about 15 percent of the weight of the final product is limestone, would simply act to further dilute the intended purposes thereof. That is not to say, however, that in another embodiment of the instant invention wherein the thrust, purpose, and objectives are to granulate limestone that small amounts of either of these two types of gypsum or mixtures thereof cannot be added thereto as may be desirable for instance, in the case of a situation wherein a supply thereof needs to be disposed of by such means.

The preferred method for introducing the solid feedstock materials to the instant process is to feed same together with any of the recycle material comprising the undersize fraction which is purposely or inadvertently removed or discharged from the granulator as well as the crushed oversize particulate material recovered from the sizing and crushing operation. This procedure is convenient, ensures that the virgin feedstock is at least partially mixed with some or most of the recycle material, and when granulating a mixture of gypsum and limestone, further ensures that at least some mixing of the these feedstocks occurs before the materials enter the granulator.

The preferred liquid binder used in the practice of the present invention is a solution of lignosulfonate and water. The lignosulfonate may be any of the cation variety, but the most preferred additive/dispersant material is ammonium lignosulfonate, due principally to economic considerations. The ammonium lignosulfonate used in the development of the instant process was obtained from the materials supplier as a 48 weight-percent solution, and the preferred additive solution prepared therefrom and introduced into the granulator comprised equal-weight parts of such 48 percent ammonium lignosulfonate solution and water, or for all practical purposes, about a 24 percent by weight ammonium lignosulfonate-water solution. In the instance wherein the lignosulfonate is calcium lignosulfonate, instead of ammonium lignosulfonate, it is normally obtained from the materials supplier in the form of a 58 weight-percent solution. Accordingly, after the subsequent dilution with about equal parts of water, the resulting additive dispersant solution will assay at about 29 percent lignosulfonate as compared to the 24 (about 25) percent when ammonium lignosulfonate is the source material. In any event, for purposes of describing the instant invention and the acceptable practice thereof, and for the convenience of the reader, such source of lignosulfonate will oftentimes be simply referred to as a 25 percent additive/dispersant solution, i.e., on a total weight basis, 25 percent is lignosulfonate.

The preferred proportion of such diluted solution, which is utilized in combination with the solids introduced into the granulation equipment, including the virgin feedstock and the recycle material (for best results) should be about 20 percent by weight (lignosulfonate and water) of feedstock when granulating phosphogypsum, about 10 percent by weight of the total feedstock when granulating limestone only, and about 20 percent by weight of the total feedstock when granulating, for example, a 90:10 percent sulfogypsum or natural gypsum or both and limestone mixture. It will be appreciated that these proportions are given herein on a dry-weight basis, and accordingly, the weight-percent moisture content of the solids materials should be taken into account. It will also be appreciated that more concentrated lignosulfonate agglomerating solutions may be used if desired; however, amounts greater than about 10 percent by weight of lignosulfonate will normally not significantly effect any further substantial advantages or improved operating efficiencies.

The preferred method for introducing the lignosulfonate solution to the process is to spray or sparge the solution phase onto the surface of the tumbling, free-flowing granulation bed; however, if the equipment that is available for practice of the present process is of an arrangement or design of the type suggested by Neilsson, supra, sparging the solution beneath the granulation bed should also be satisfactory for introducing the solution phase to the granulator.

It was found in the operation of the bench scale equipment, described supra, that with the continuous granulation of phosphogypsum or a sulfogypsum or natural gypsum or both and limestone mixture, the moisture content of the resulting granular product was in the range of from about 6 to about 10 percent by weight. Accordingly, drying of such resulting product could be accomplished simply, for example, by passing such material through a conventional, rotary-type dryer equipped with lifting flights. In the continuous granulation of limestone, i.e., no gypsum, the moisture content of the resulting granulated product was observed to be in the range of from about 4 to about 6 percent by weight and, depending on the intended end use thereof, further or subsequent drying of such a product may or may not be required since this product appeared to be in quite satisfactory condition, in regard to moisture content and particle size, for immediate broadcast to soil. It is recommended, however, that if this material is destined for even a relatively short period of storage, drying and screening of same, subsequent to the removal of same from the granulating means and prior to such storage, should be effected.

Screening of the product discharged from the granulator may be practiced in any convenient manner including the usual method employing stacked, vibrating screens. A typical screen stack that might be employed during the production of granules and the subsequent sizing of same to match the size (minus 6- plus 16-mesh Tyler Standard Screen Scale) of recommended particle-size distribution of conventionally-marketed granular fertilizers consists of a 5-mesh screen stacked atop a 10-mesh screen (Tyler Standard Screen Scale). The onsize fraction utilized in the fertilizer industry is normally minus 6- plus 16-mesh Tyler Standard Screen Scale. Under laboratory conditions, this fraction could be determined or derived using a 6-mesh screen on top and a 16-mesh screen on the bottom which, by definition, would be a minus 6- plus 16-mesh product. However, because of operating conditions encountered in continuous bench-, pilot-, or commercial-scale operations, such as residence time and buildup of material on screens, a 6-mesh screen on top and a 16-mesh screen on the bottom does not lend itself to continuous operation. It has long been known in the industry that a minus 6- plus 16-mesh product could not be obtained using minus 6- plus 16-mesh screens under normal, continuous operation. Therefore, by empirical determination what usually is used are 5- and 10-mesh screens, rather than 6- and 16-mesh screens. The product resulting from this plant operating scheme gives a product of Tyler Standard Screen Scale size distribution so that approximate percentage, by weight of material retained on individual screens is 2 percent on the 6-mesh, 14 percent on the 7 mesh, 36 percent on the 8-mesh, 69 percent on the 9-mesh, 85 percent on the 10-mesh, 94 percent on the 12-mesh, 98 percent on the 14-mesh, and 100 percent on the 16-mesh screen. Oversize material, meaning that not passing the 6-mesh screen (plus 5-mesh), may be pulverized and recycled to the granulator along with other fines. Undersize, meaning that passing the 16-mesh screen, may be recycled either with or without further grinding, pulverization, or comminution thereof.

EXAMPLES

In order that those skilled in the art may better understand how the present invention can be practiced, the following examples are given by way of illustration and not necessarily by way of limitation.

The following three examples are generally illustrative of the three categories of materials treated according to the practice of the instant invention and are presented in generalized form in Table 1, infra, for ease in understanding an application for the reader. As will be seen, Example I dealt with granulating the type of gypsum that requires no limestone, i.e., phosphogypsum, Example III dealt with the granulation of straight limestone, and Example II dealt with a particular mixture of 90 percent sulfogypsum and 10 percent limestone. It must be remembered, of course, that as indicated in footnote (e) of Table 1, that as in the case of Example II either sulfogypsum or mineral gypsum or mixtures thereof require prerequisite amounts of limestone to be added in combination to effect the granulation. It must also be remembered that as previously stated, it has been found that when either of these two types of gypsum, alone or in combination, are used in the special mix with limestone that there must be at least about 5 percent limestone mixed therewith to effect smooth and easy practice of the instant invention and yield of products having the desired characteristics enumerated, supra. As also stated previously, as much as about 15 percent limestone can be added, but that it has been determined that approximately a 90 percent gypsum (sulfogypsum or mineral gypsum or both) - 10 percent limestone mix, is the most preferred proportions when either of these two types of gypsum are used as feedstock. Accordingly, although Example II, infra, refers to nine tests utilized for obtaining the data presented therein and in Table 1, and that all of said nine tests were performed with such a 90:10 mix, the instant invention is obviously not to be unduly limited to this particular disclosure or example.

EXAMPLE I

In a series of four tests comprising this example, undried phosphogypsum was screened to remove the plus 4-mesh Tyler Standard Screen Scale size material, and the remaining material of a U.S. Standard Screen Scale size distribution of about 35 to 50 percent plus 200 mesh, about 6 to 14 percent plus 325 mesh, and about 40 to 80 percent minus 325 mesh was granulated at a production rate of about 33 pounds/hour in continuous operation with use of the laboratory bench-scale equipment, described infra. The drum granulator used in these tests was a 12-inch diameter rotary drum that was 12 inches in length and was sloped about 1 inch/foot from the feed end to the discharge end. Rotation of the drum for most of these tests was controlled at about 50 revolutions/minute. The drum was fitted with a 2 ⅜inch high and a 2-inch high retainer ring at the feed and discharge ends, respectively The solution-phase additive for effecting binding and agglomeration, and comprising a mixture of 1 part of a 48 percent solution of ammonium lignosulfonate and 3 parts of water was sprayed, by means of an air-atomized nozzle, into the granulator and onto the surface of the bed of material maintained therein in free-flowing condition, said bed comprising phosphogypsum and recycle material. The quantity of the diluted (ratio of 48% lignosulfonate solution to water of 1:3) solution used/ton of final product was about 500 pounds.

Granular material containing about 9 percent by weight moisture and having a particle (minus 7- plus 8-mesh Tyler Standard Screen Scale granules) crushing strength of about 1 pound, was discharged from the granulator and conveyed by means of a bucket elevator to a rotary drum-type dryer 12 inches in diameter and 36-inches long. This dryer unit was equipped with 8 evenly spaced 2-inch high lifting flights and with 2 ½- and 2 ¼-inch high retainers at the feed and discharge end, respectively. The dryer was operated on a slope of about 1 inch/foot from the feed end to the discharge end and was rotated at about 10 revolutions/minute. In operation, a propane burner and a jet of air, equivalent to about 7,000 cubic feet/minute/ton of product were directed Into the feed end of the dryer unit to induce drying of the material therein. The residence time for granular material introduced into this dryer, when said unit was used to produce about 30 pounds/hour of product was about 8 minutes. The temperature of material discharged from the dryer was about 220° F., free moisture content was about 0.3 percent by weight, and size distribution as determined by the Tyler Standard Screen Scale was 21 percent plus 6 mesh, 65 percent minus 6 plus 16 mesh, and 14 percent minus 16 mesh. The recommended particle size of granular (fertilizer for direct application or for blending with other bulk-blend fertilizers is minus 6- plus 16-mesh Tyler Standard Screen Scale, and this size fraction is commonly identified by the industry as "onsize material." Preferably, the size distribution of a blend material should be so that about 2 percent is retained on the 6-mesh screen, about 36 percent retained on the 8-mesh screen, about 85 percent retained on the 10-mesh screen, and about 94 percent retained on the 12-mesh screen. In this bench-scale operation, heat loss from the dryer unit was determined and observed to be excessive and a cooler was not needed nor used; consequently, the material discharged from the dryer flowed by gravity directly to the screen deck.

The material exiting the dryer was sized by screening on a deck of 5- and 10-mesh Tyler Standard Screen Scale. Free-moisture content of the resulting onsize product (minus 6- plus 16-mesh size) was 0.3 percent by weight. Granule crushing strength of granules (the minus 7- plus 8-mesh Tyler Standard Screen Scale fraction) ranged from about 5 to about 7 pounds. Chemical analyses of the product revealed that it contained 19.8 percent calcium and 13.6 percent sulfur. In the conduct of the aforementioned tests, no substantial problems were observed in handling and/or transport of feed or product materials.

An addendum to this series of tests presenting typical bench-scale plant operating conditions is presented below in Table I. Portions of the products resulting from the above practice of the instant process was subjected to testing of its propensity to revert to its original size distribution when placed in contact with moisture. Accordingly, small samples of granular products were placed in glass beakers containing enough water to cover the granules, and propensity to revert to original fine-size particle distribution was observed visually. From observations, it appeared that on contact with water, the hard granules began immediately to revert to original fine-size particle distribution, and after about 2 to 3 minutes, visual observation indicated that the granule had disintegrated to their original fine particle-size distribution.

The propensity of the granular products resulting from practice of the instant invention, to revert to original particle-size distribution was further evaluated in the analytical laboratory by subjecting the granular products and feedstock materials to simulated rainfall tests. In the analytical test, a 100-gram sample of granular material was placed on an assembly of sieves consisting of 20, 40, 100, and 325 (U.S. Standard Testing Sieves) and then a light spray of water was directed onto the samples. The water spray was controlled to deliver approximately 500 milliliters of water over the samples in a period of 30 minutes, which was equivalent to 0.5-inch rainfall. The screens were assembled so that the water percolated the material downward with successively smaller fractions being collected on the sieves. When the 500 milliliters of water had passed through the assembled sieves, the sieves were disassembled beginning with the top (20 mesh) sieve. Each sieve was washed with a small amount of water to properly wash a small amount of sample, which had accumulated at the center of each sieve. This light washing was necessary to ensure that each sieve contained only the proper fraction size. The sieves were then dried at 65° C. for 2 hours, cooled, and weighed. The percent of the original material in each fraction was calculated based on the weight of a sample of original granular material that had been dried for 2 hours at 65° C. Results of the analytical tests presented as Table II, infra, show that when granular gypsum, limestone, or the instant special gypsum-limestone mix products produced by teachings of the instant invention are wetted or subjected to about a 0.5-inch simulated rainfall, they revert to essentially their original fine-size particle distribution as shown in Table II, infra, so that effectiveness of the materials, in regard to crop response, is not sacrificed.

Although the particle-size distribution of the feedstock materials, as well as the granular products, after their subjection to simulated rainfall are presented in

TABLE I

Typical Bench-Scale Operating Data During Agglomeration of Gypsum[d], Limestone[f], or Special Gypsum-Limestone[e,f] Mix[g]

|  | Gypsum[d] | Gypsum-[e] Limestone[f] | Limestone[f] |
|---|---|---|---|
| MATERIAL GRANULATED | | | |
| OPERATING TIME, h | 4 | 4 | 4 |
| GRANULAR CONDITIONS | | | |
| Drum rotation, r/min | 50 | 50 | 45 |
| Feed rates, g/min | | | |
| Limestone | — | 23 | 600 |
| Gypsum | 250 | 204 | — |
| Lignosulfonate solution[a] | 60 | 62 | 60 |
| Recycle | | | |
| Temperature, °F. | 90 | 85 | 90 |
| Recycle ratio, lb/lb product | 2.5 | 1.1 | 0.7 |
| Product temperature, °F. | 90 | 80 | 100 |
| Moisture content, wt %[b] | 8.3 | 7.4 | 5.0 |
| Granule (−7 +8 Tyler Std. Screen Scale) crushing strength, lb | 1.0 | 1.0 | 1.0 |
| DRYER CONDITIONS | | | |
| Drum rotation, r/min | 10 | 10 | 10 |
| Airflow (1 atm and 70° F.), ft$^3$/min | 3 | 3 | 3 |
| Product temperature, °F. | 220 | 200 | 200 |
| Screen analysis (Tyler Std. Screen Scale), wt % | | | |
| +6 | 21.1 | 25.1 | 4.4 |
| −6 +16 | 64.9 | 68.2 | 91.9 |
| −16 | 14.0 | 6.7 | 3.7 |
| Moisture content, wt %[b] | 0.3 | 0.3 | 0.2 |
| Granule (−7 +8 Tyler Std. Screen Scale), crushing strength, lb | 7.0 | 4.0 | 7.0 |
| ONSIZE PRODUCT | | | |
| Screen analysis, (Tyler Std. Screen Scale), Wt % | | | |
| +5 | 1.3 | 0 | 0.1 |
| −5 +6 | 18.9 | 1.1 | 2.2 |
| −6 +8 | 37.2 | 51.1 | 16.7 |
| −8 +10 | 37.9 | 42.5 | 69.1 |
| −10 +12 | 3.2 | 4.1 | 9.2 |
| −12 +16 | 0.9 | 0.9 | 2.4 |
| −16 | 0.6 | 0.3 | 0.3 |
| Chemical analysis, wt % | | | |
| CaCO$_3$ equivalent | —[c] | 13.1 | 87.8 |
| SO$_4$—S | 13.6 | 13.5 | — |
| Mg | 0.02 | 0.2 | 1.37 |
| Ca | 19.8 | —[c] | —[c] |
| Moisture | 0.3 | 0.3 | 0.2 |

[a]Mixture of 50 percent ammonium lignosulfonate (48%) and 50 percent water.
[b]AOAC vacuum desiccator method.
[c]Not determined.
[d]Phosphogypsum from wet-process phosphoric acid production.
[e]Sulfogypsum from neutralization of sulfuric acid with limestone (or mineral gypsum, i.e., naturally occuring and mined, this material could be substituted for sulfogypsum. It has also been found that mixtures of the two can be substituted for straight sulfogypsum).
[f]Agricultural limestone.
[g]Mix must be in the range of from about 80 to about 95 percent by weight gypsum[3] and preferably about 90 percent gypsum[e].

TABLE II

Particle-Size Distribution of Feedstock Materials and of Granular Products After Subjection to 0.5-Inch Rainfall*

| Material | Percent in indicated fraction, U.S. Standard Testing Sieves | | | | |
|---|---|---|---|---|---|
| | +20 | −20 +40 | −40 +100 | −100 +325 | −325 |
| Feedstock materials | | | | | |
| Gypsum (Phosphogypsum) | 0.0 | 0.7 | 16.6 | 42.9 | 39.8 |
| Limestone | 21.2 | 17.8 | 23.9 | 15.1 | 22.0 |
| Granular products after 0.5-inch rainfall | | | | | |
| Granular phosphogypsum | 1.3 | 1.8 | 15.6 | 41.5 | 39.8 |
| Granular limestone | 21.9 | 17.6 | 23.8 | 15.6 | 21.1 |
| Gypsum-limestone | 1.4 | 1.0 | 13.6 | 44.7 | 39.3 |

*Simulated.

finite form above, it is noted that these are averages. Accordingly, the particle-size distribution for either of the feedstock materials varies over a set of ranges wherein a substantial portion thereof will fall in the sets as follows. For gypsum the set of most typical U.S. Standard Testing Sieve size ranges is as follows: usually substantially less than about 1 percent plus 20 mesh and about 0.1 to about 2 percent minus 20 plus 40 mesh, about 10 to 20 percent minus 40 plus 100 mesh, about 30 to 50 percent minus 100 plus 325 mesh, and about 30 to 50 percent minus 325 mesh. For agricultural limestone the set of typical size ranges is as follows: about 15 to 25 percent plus 20 mesh, about 15 to 25 percent minus 20 plus 40 mesh, about 15 to 30 percent minus 40 plus 100 mesh, about 10 to 20 percent minus 100 plus 325 mesh, and about 15 to 25 percent minus 325 mesh.

EXAMPLE II

In a series of nine tests comPrising this example, a mixture consisting of 90 percent gypsum of essentially the same particle-size distribution as that given in Example I, supra, and 10 percent of agricultural limestone and having particles of a size distribution so that no less than 90 percent passes through a No. 10 mesh U.S. Standard Testing Sieve and no less than 50 percent passes through the No. 60 mesh screen was granulated to the preferred form with use of the same equipment and according to the same procedures as described in Example I, suPra. The solution phases utilized in these tests to effect the desired granulation were mixtures of 48 percent ammonium lignosulfonate solution and water, with the weight ratio of the lignosulfonate (48% lignosulfonate solution) to water being varied over a range from 1:1 to 1:3. The proportion of solution phase combined with the solids portion and introduced into the granulator for purposes of inducing granulation was about 400 pounds/ton of resulting and finished product. The percent of onsize (minus 6- plus 16-mesh Tyler Standard Screen Scale) material discharged from the granulator ranged from about 42 to about 76 percent, with this onsize product having a moisture content ranging from about 6 to about 10 percent and a granule (minus 7- plus 8-mesh Tyler Standard Screen Scale size) crushing strength ranging from about 1 to about 2 pounds. After drying and screening of these products, the free-moisture contents of same were observed to range from about 0.2 to about 0.3 percent, and granule hardness (minus 7- plus 8-mesh Tyler Standard Screen Scale size fraction) Was about 4 pounds. As in Example I, supra, the conduct of these tests presented no problems in regard to reverting to the original fine-sIze particle distribution when wetted.

An addendum to this series of nine tests presenting typical bench-scale operating data is presented as Table I, supra.

EXAMPLE III

In a series of ten tests, agricultural limestone of the same particle size distribution as given in Example 11, supra, was granulated to the preferred form with the use of the same equipment and according to the same procedure as described in Example I, supra. The granulation solutions used in these tests were mixtures of 48 percent ammonium lignosulfonate and water, with the weight proportions (lignosulfonate:water) used therein being varied from 1:3 to 3:1. The proportion of such liquid-phase solutions used in these tests ranged from about 8 to about 11 percent by weight of the total feed material.

The minus 6- plus 16-mesh Tyler Standard Screen Scale size material in the granulator ranged from about 85 to about 90 percent, and crushing strength of the minus 7- plus 8-mesh Tyler Standard Screen Scale size particles was from about 1 to about 2 pounds. After drying and screening, free-moisture contents of products ranged from about 0.1 to about 0.3 percent and crushing strength of the minus 7- plus 8-mesh Tyler Standard Screen Scale size fraction was about 8 pounds. No problems, in regard to material handling, were encountered in carrying out these tests. As in Examples I and II, supra, the conduct of these tests presented no problems.

The propensity of the products produced in this series of tests to revert to their original fine-size particle distribution when subjected to the tests detailed in Example I, supra, showed that before granulation, the U.S. Standard Testing Sieve particle-size distribution of the feedstock contained 21.2 percent plus 20 mesh material, 17.8 percent minus 20 plus 40 mesh material, 23.9 percent minus 40 plus 100 mesh, 15.1 percent minus 100 plus 325 mesh, and 22 percent minus 325 mesh, and after subjection to the wetting test, the granules had degradated to a degree such that the three largest size fractions, i.e., plus 20 mesh, minus 20 plus 40 mesh, and minus 40 plus 100 mesh all contained from about 18 to about 22 percent with the minus 100 plus 325 mesh containing about 15 percent and the minus 325 mesh containing about 20 percent. Typical operating data for these tests have been shown in Table I, supra.

INVENTION PARAMETERS

After sifting and windowing through the data herein presented, as well as other results and operations of the instant, new, and novel process for granulating finely-divided gypsum, limestone, or mixtures thereof to manufacture products which are essentially dust-free when handled, are eminently suitable for direct application to the soil, for use in the bulk-blending segment of the agricultural area of industry, for use in the manufacture of Portland cement, or for use in soil-stabilization applications. The operating variable and preferred conditions for carrying out these new processes are summarized below.

| Variables | Operating | Preferred |
|---|---|---|
| Gypsum Only | | |
| Gypsum[a], wt % | 75–85 | 80 |
| Agglomerating solution[b] | 15–25 | 20 |
| Lignosulfonate, wt % of product | 4–10 | 5–7 |
| Limestone Only | | |
| Limestone[c], wt % | 85–95 | 90 |
| Agglomerating solution[b] | 5–15 | 10 |
| Lignosulfonate, wt % of product | 3–8 | 3–6 |
| Gypsum-Limestone | | |
| Gypsum[d], wt % | 80–95 | 72 |
| Limestone[c], wt % | 5–20 | 8 |
| Agglomerating solution[b] | 15–25 | 20 |
| Lignosulfonate, wt % of product | 4–10 | 5–7 |

[a] Any phosphogypsum, pure or impure, that is essentially of powder size.
[b] Ammonium lignosulfonate 48 percent solution or calcium lignosulfonate 58 percent solution mixed with $H_2O$ in a 1:1 to 1:3 ratio.
[c] Any limestone, pure or impure, that has been ground to meet specifications set by USDA for agricultural purposes.
[d] Any sulfogypsum, pure or impure, that is essentially of powder size or naturally occurring gypsum, mined and comminuted to a fine powder, or mixtures of both.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claimed as new and desire to secure by Letters Patent of the United States is:

1. A process for making a granular fertilizer product for use as a source of calcium secondary plant nutrient, to produce agglomerated granules of sufficient strength, proper size, and adequate weight to be suitable for mechanical dispensing and application to and into the soil, from fine particles of a calcium source that is characterized by poor solubility in water and by slow conversion in the soil to a form in which it is useful to plant life growing in the soil, said calcium source being selected from a mixture of fine particles of limestone and fine particles of gypsum, said particles of limestone having an individual particle-size distribution of about 15 to 25 percent plus 20 mesh, about 10 to 25 percent minus 20 plus 40 mesh, about 15 to 30 percent minus 40 plus 100 mesh, about 10 to 25 percent minus 100 plus 325 mesh, and about 15 to 25 percent minus 325 mesh, U.S. Standard Testing Sieve, said particles of gypsum having an individual particle-size distribution of about 0.1 to about 2 percent minus 20 plus 40 mesh, about 10 to 20 percent minus 40 plus 100 mesh, about 30 to 50 percent minus 100 plus 325 mesh, and about 30 to 50 percent minus 325 mesh, U.S. Standard Testing Sieve, the relative proportions of said gypsum and said limestone being from about 80 parts to about 95 parts by weight of said gypsum and from about 20 parts to about 5 parts by weight of said limestone, said gypsum selected from the group consisting of sulfogypsum, mineral gypsum, and mixtures thereof, said particles being present in an amount to comprise from about 90 percent to about 96 percent by weight of said granules, dry basis, and comprising:

applying to said particles a small but effective amount of a binder so as to bind said fine particles together in the form of granular agglomerates, said binder after distribution of the granules in the soil being capable of permitting the utilization of the secondary plant nutrient calcium values of said particles;

drying and screening the agglomerated granules to produce granular agglomerated product having sizes in the range from between about 60 percent to about 90 percent minus 6 plus 16 mesh, Tyler Standard Screen Scale;

said binder being selected from the group consisting of a water-soluble metal or ammonium salt of lignosulfonic acid and mixtures thereof, and applied so that the average crushing strength of a sample of said granules, selected to have a size range of minus 7 plus 8 tyler Standard Screen Scale, is at least about three pounds per granule.

2. The process of claim 1, said binder comprising an aqueous solution of ammonium lignosulfonate.

3. The process of claim 2, said binder comprising an aqueous solution of calcium lignosulfonate.

4. The process of claim 2, wherein said aqueous solution contains from about 20 percent to about 60 percent by weight of said ammonium lignosulfonate.

5. The process of claim 3, wherein said aqueous solution contains from about 20 percent to about 60 percent by weight of said ammonium lignosulfonate.

6. The process of claim 4, the relative proportion of said gypsum and said limestone being about 90 parts by weight of said gypsum and about 10 parts by weight of said limestone.

7. The process of claim 5, the relative proportion of said gypsum and said limestone being about 90 parts by weight of said gypsum and about 10 parts by weight of said limestone.

8. A granular fertilizer product that in the soil is a source of calcium secondary plant nutrient values, said granules of said product being suitable for mechanical dispensing for application to and into the soil, said granules consisting of a mixture comprising:

particles of a material selected from the group consisting of sulfogypsum, mineral gypsum, and mixtures thereof, said gypsum particles having an individual particle-size distribution of about 0.1 to about 2 percent minus 20 plus 40 mesh, about 10 to 20 percent minus 40 plus 100 mesh, about 30 to 50 percent minus 100 plus 325 mesh, and about 30 to 50 percent minus 325 mesh, U.S. Standard Testing Sieve;

particles of agricultural limestone, said limestone particles having an individual particle-size distribution of about 15 to 25 percent plus 20 mesh, about 10 to 25 percent minus 20 plus 40 mesh, about 15 to 30 percent minus 40 plus 100 mesh, about 10 to 25 percent minus 100 plus 325 mesh, and about 15 to 25 percent minus 325 mesh, U.S. Standard Testing Sieve;

an effective amount, by weight of the granules, of a water-soluble binder that binds said particles in said binder in a form which is granular;

the relative proportions of said particles of gypsum and limestone and of said binder in said granular product being from about 90 parts to about 96 parts by weight of said particles and from about 10 parts to about 4 parts by weight of said binder;

the relative proportions of said gypsum material and said limestone being from about 80 parts to about 95 parts by weight of said gypsum and from about 20 parts to about 5 parts by weight of said limestone;

said binder being selected from the group consisting of a water-soluble metal or ammonium salt of lignosulfonic acid and mixtures thereof;

said binder, after distribution of the granules in the soil, being capable of undergoing disintegration with release of said particles, thus permitting the utilization in the soil of the secondary plant nutrient calcium values of said particles;

said granules being suitable in granule strength and weight for mechanical dispensing and for application to and into the soil, the average crushing strength of a sample of said granules, selected to have a size range of minus 7 plus 8 Tyler Standard Screen Scale, being at least about three pounds.

9. A granular fertilizer product according to claim 8, wherein said binder comprises an aqueous solution of ammonium lignosulfonate.

10. A granular fertilizer product according to claim 8, wherein said binder comprises an aqueous solution of calcium lignosulfonate.

11. A granular fertilizer product according to claim 9, wherein said aqueous solution contains from about 20 percent to about 60 percent by weight of said ammonium lignosulfonate.

12. A granular fertilizer product according to claim 10, wherein said aqueous solution contains from about 20 percent to about 60 percent by weight of said ammonium lignosulfonate.

13. A granular fertilizer product according to claim 11, the relative proportion of said gypsum and said limestone being about 90 parts by weight of said gypsum and about 10 parts by weight of said limestone.

14. A granular fertilizer product according to claim 12, the relative proportion of said gypsum and said limestone being about 90 parts by weight of said gypsum and about 10 parts by weight of said limestone.

* * * * *